United States Patent
Al-Dahle et al.

(10) Patent No.: US 9,201,549 B2
(45) Date of Patent: *Dec. 1, 2015

(54) SYSTEMS AND METHODS FOR MONITORING LCD DISPLAY PANEL RESISTANCE

(71) Applicant: APPLE INC., Cupertino, CA (US)

(72) Inventors: Ahmad Al-Dahle, Santa Clara, CA (US); Yafei Bi, Palto Alto, CA (US); Mir B. Ghaderi, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 349 days.

This patent is subject to a terminal disclaimer.

(21) Appl. No.: 13/679,793

(22) Filed: Nov. 16, 2012

(65) Prior Publication Data

US 2014/0062940 A1    Mar. 6, 2014

Related U.S. Application Data

(63) Continuation-in-part of application No. 13/601,547, filed on Aug. 31, 2012.

(51) Int. Cl.
| | |
|---|---|
| G09G 3/36 | (2006.01) |
| G06F 3/044 | (2006.01) |
| G06F 3/041 | (2006.01) |

(52) U.S. Cl.
CPC ............. *G06F 3/044* (2013.01); *G06F 3/0412* (2013.01); *G06F 3/0416* (2013.01); *G09G 3/36* (2013.01)

(58) Field of Classification Search
None
See application file for complete search history.

(56) References Cited

U.S. PATENT DOCUMENTS

| | | | |
|---|---|---|---|
| 2003/0023394 A1* | 1/2003 | Bierl ............................... | 702/57 |
| 2007/0103412 A1* | 5/2007 | Tang et al. ..................... | 345/87 |
| 2009/0273550 A1 | 11/2009 | Vieri et al. | |
| 2011/0298811 A1 | 12/2011 | Al-Dahle et al. | |
| 2012/0161660 A1* | 6/2012 | Joo ................................. | 315/240 |
| 2013/0050130 A1* | 2/2013 | Brown .......................... | 345/174 |
| 2013/0082843 A1 | 4/2013 | Wurzel et al. | |
| 2013/0082973 A1 | 4/2013 | Wurzel et al. | |

* cited by examiner

*Primary Examiner* — Ryan A Lubit
*Assistant Examiner* — Lisa Landis
(74) *Attorney, Agent, or Firm* — Fletcher Yoder PC

(57) ABSTRACT

Systems and methods for monitoring internal resistance of a display may include supplying the display via a capacitor with a first voltage and a second voltage configured to enable the display to receive touch inputs and display image data, respectively. The method may discharge the capacitor at least three times via a first resistor, a second resistor, and the first resistor and second resistor coupled in parallel with each other. The method may monitor three discharge waveforms that corresponds to when the capacitor discharges from the first voltage to the second voltage via the first resistor, the second resistor, and the first resistor and second resistor coupled in parallel with each other. Based at least in part on the discharge waveforms, the method may determine a chip on glass resistance value and a flex on glass resistance value that correspond to an internal resistance of the display.

20 Claims, 11 Drawing Sheets

SYSTEMS AND METHODS FOR MONITORING LCD DISPLAY PANEL RESISTANCE

CROSS-REFERENCE TO RELATED APPLICATIONS

This application is a continuation-in-part of U.S. patent application Ser. No. 13/601,547, entitled "Systems and Methods for Monitoring LCD Panel Resistance," filed Aug. 31, 2012, which is herein incorporated by reference in its entirety.

BACKGROUND

The present disclosure relates generally to methods for monitoring various characteristics of a liquid crystal display (LCD) panel and, more specifically, to measuring and monitoring a resistance within the LCD panel over time.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

After a liquid crystal display (LCD) panel is manufactured, the LCD panel is tested to determine whether it meets certain quality or performance standards. A common test for determining the quality of a manufactured LCD panel includes testing a contact resistance of a chip on glass (COG) circuit and a flex on glass (FOG) circuit in the LCD panel. For instance, the quality of the LCD panel can be assessed based on the COG contact resistance value and the FOG contact resistance value of the LCD panel. To measure the COG and FOG resistance values, dedicated input/output (I/O) pads on a display driver integrated circuit (IC) in the LCD panel and dedicated I/O pads on a flexible printed circuit (FPC) in the LCD panel are coupled to a separate test glass panel. The test glass panel measures the COG and FOG resistance values via the I/O pads of the display driver IC and the FPC.

Although the separate test glass panel provides a way to measure the COG and FOG resistance values of an LCD panel, the test glass panel can just be used during the development or production of the LCD panel. As such, the COG and FOG resistance values cannot be monitored after the LCD panels are assembled into their respective products. Since COG and FOG resistance values can vary as the LCD panel ages, information related to how the COG and FOG resistance values vary over time may be useful in further assessing the quality of the LCD panel.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to monitoring internal contact resistance values of a liquid crystal display (LCD) panel over time. More specifically, the present disclosure relates to measuring resistances in a chip on glass (COG) circuit and a flex on glass (FOG) circuit in the LCD panel over time. In certain embodiments, an electronic device may use an LCD panel as a display and as an interface to receive touch inputs via touch-sensing circuitry within the LCD panel. To simultaneously display image data and detect touches, the LCD panel may frequently alternate between a display period mode (e.g., when a frame of image data is rendered on an active display region of the LCD panel) and touch period mode (e.g., when the active display region detects touch inputs). The display period and touch period modes for the LCD panel may be characterized by two different sets of voltages applied to the active display region of the LCD panel via two supply rails (e.g., high and low).

During the display period, the active display region may receive a first set of voltages from the high and low supply rails such that the active display region may be capable of displaying the image data. During the touch period, the active display region may receive a second set of voltages from the high and low supply rails such that the active display region may be capable of detecting touch inputs. The first and second sets of voltage values may be provided on the high and low supply rails by charging and discharging capacitors that may be coupled to each supply rail. In addition to the capacitor, each supply rail may be in series with the COG circuit, the FOG circuit, and a number of switches coupled to ground via a number of resistors (i.e., discharge circuitry). When transitioning from a touch period voltage to a display period voltage, one of the switches in series with the supply rail and a resistor may be closed until the voltage of the capacitor on the supply rail is discharged to the display period voltage. After reaching the display period voltage, the respective switch may be opened for some period of time (e.g., display period) until the capacitor is to be discharged again. This process may be continuously repeated (i.e., discharge cycles), thereby enabling the LCD panel to simultaneously display image data and detect touch inputs.

In one embodiment, when transitioning between the touch and display period voltages, the discharge circuitry may discharge the capacitor using a first switch via a first resistor during a first discharge cycle, discharge the same capacitor using a second switch via a second resistor during a subsequent discharge cycle, and discharge the same capacitor during another discharge cycle using both the first switch and the second switch. By monitoring the resulting discharge waveforms using the various arrangements of the two different switches, a processor coupled to the LCD panel may determine the resistances of the COG circuit and the FOG circuit in the LCD panel at any time while the LCD panel is in operation. That is, since the touch period voltage, the display period voltage, the resistance values of the first and second resistors, and amounts of time elapsed to reach the display period voltage in each discharge cycle are known, the processor may determine the total COG and FOG resistance values by solving a system of equations based on the natural response of a resistor-capacitor (RC) circuit (i.e., discharge circuitry). Accordingly, the processor may monitor the COG and FOG resistance values at any time while the LCD panel is in operation to further assess the quality of the LCD panel as the LCD panel ages.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to systems and methods for determining chip on glass (COG) and flex on glass (FOG) resistance values of a liquid crystal display (LCD) panel over time. Different LCD manufacturers produce different LCD panels that have different COG and FOG resistance values. In certain embodiments, electronic devices may use a single display driver integrated circuit (IC) to drive different LCD panels provided by different LCD manufacturers. As such, the single display driver IC may include a voltage supply rail that may couple in series to a COG circuit, a FOG circuit, a number of switches, and a number of resistors.

Keeping the foregoing in mind, in one embodiment, a processor may use two different switches in the display driver IC at two different times to discharge a capacitor in series with the COG circuit and the FOG circuit on the supply line from a touch period voltage (i.e., to enable the LCD panel to detect touch inputs) to a display period voltage (i.e., to enable the LCD panel to display image data). The processor may then determine the resistance values of the COG and FOG circuits based on the two discharge waveforms that corresponds to the two different switches. Additional details with regard to how the processor may determine the COG and FOG resistance values of the LCD panel will be discussed below with reference to FIGS. 1-16.

Figure 1:
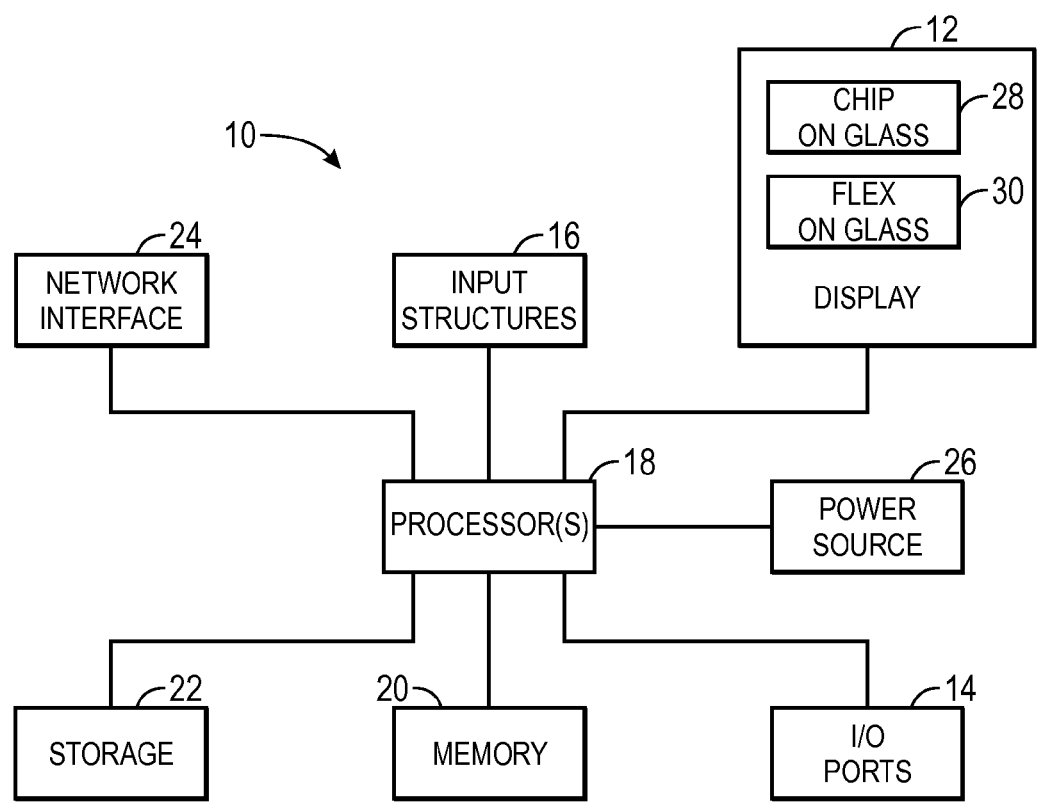
FIG. 1 is a block diagram of exemplary components of an electronic device, in accordance with an embodiment.

A variety of electronic devices may incorporate systems and methods for determining the COG and FOG resistance values of an LCD panel. An example of a suitable electronic device may include various internal and/or external components, which contribute to the function of the device. FIG. 1 is a block diagram illustrating the components that may be present in such an electronic device 10 and which may allow the electronic device 10 to function in accordance with the methods discussed herein. Those of ordinary skill in the art will appreciate that the various functional blocks shown in FIG. 1 may include hardware elements (including circuitry), software elements (including computer code stored on a computer-readable medium), or a combination of both hardware and software elements. It should further be noted that FIG. 1 is merely one example of a particular implementation and is merely intended to illustrate the types of components that may be present in the electronic device 10. For example, in the presently illustrated embodiment, these components may include a display 12, I/O ports 14, input structures 16, one or more processors 18, a memory device 20, a non-volatile storage 22, a networking device 24, a power source 26, a chip on glass (COG) circuit 28, a flex on glass (FOG) circuit 30, and the like.

With regard to each of these components, the display 12 may be used to display various images generated by the electronic device 10. Moreover, the display 12 may be a touch-screen liquid crystal display (LCD), for example, which may enable users to interact with a user interface of the electronic device 10. In some embodiments, the display 12 may be a MultiTouch™ display that can detect multiple touches at once.

The I/O ports 14 may include ports configured to connect to a variety of external I/O devices, such as a power source, headset or headphones, peripheral devices such as keyboards or mice, or other electronic devices 10 (such as handheld devices and/or computers, printers, projectors, external displays, modems, docking stations, and so forth).

The input structures 16 may include the various devices, circuitry, and pathways by which user input or feedback is provided to the processor 18. Such input structures 16 may be configured to control a function of the electronic device 10, applications running on the electronic device 10, and/or any interfaces or devices connected to or used by the electronic device 10.

The processor(s) 18 may provide the processing capability to execute the operating system, programs, user and application interfaces, and any other functions of the electronic device 10. The instructions or data to be processed by the processor(s) 18 may be stored in a computer-readable medium, such as the memory 20. The memory 20 may be provided as a volatile memory, such as random access memory (RAM), and/or as a non-volatile memory, such as read-only memory (ROM). The components may further include other forms of computer-readable media, such as the non-volatile storage 22, for persistent storage of data and/or instructions. The non-volatile storage 22 may include flash memory, a hard drive, or any other optical, magnetic, and/or solid-state storage media. The non-volatile storage 22 may be used to store firmware, data files, software, wireless connection information, and any other suitable data. In certain embodiments, the processor 18 may control the operation of various switches and hardware components that may be located within the electronic device 10 including the COG circuit 26 and the FOG circuit 28.

The network device 24 may include a network controller or a network interface card (NIC). Additionally, the network device 24 may be a Wi-Fi device, a radio frequency device, a Bluetooth® device, a cellular communication device, or the like. The network device 24 may allow the electronic device 10 to communicate over a network, such as a Local Area Network (LAN), Wide Area Network (WAN), or the Internet. The power source 26 may include a variety of power types such as a battery or AC power.

Figure 2:
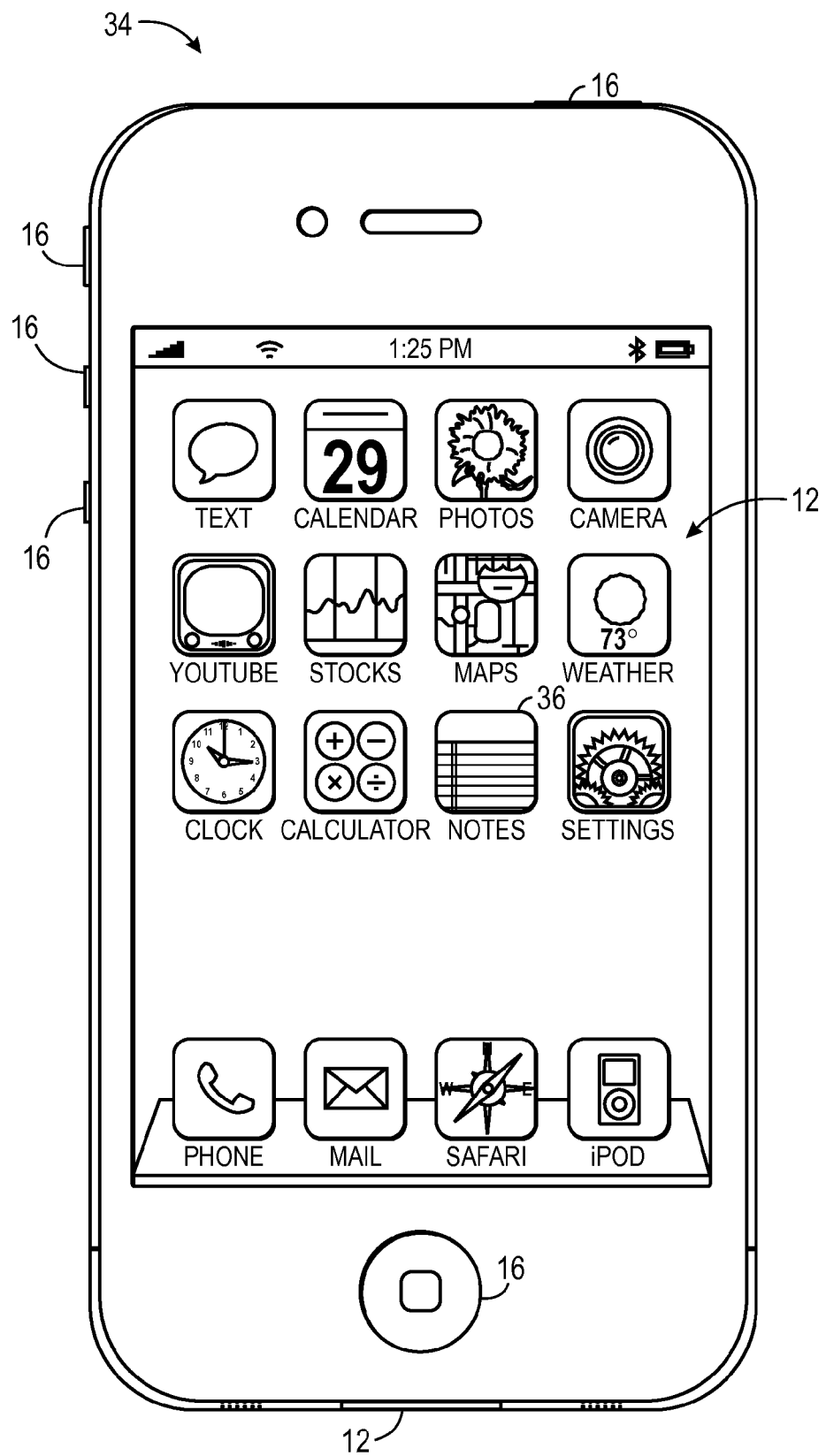
FIG. 2 is a front view of a handheld electronic device, in accordance with an embodiment.
Figure 3:
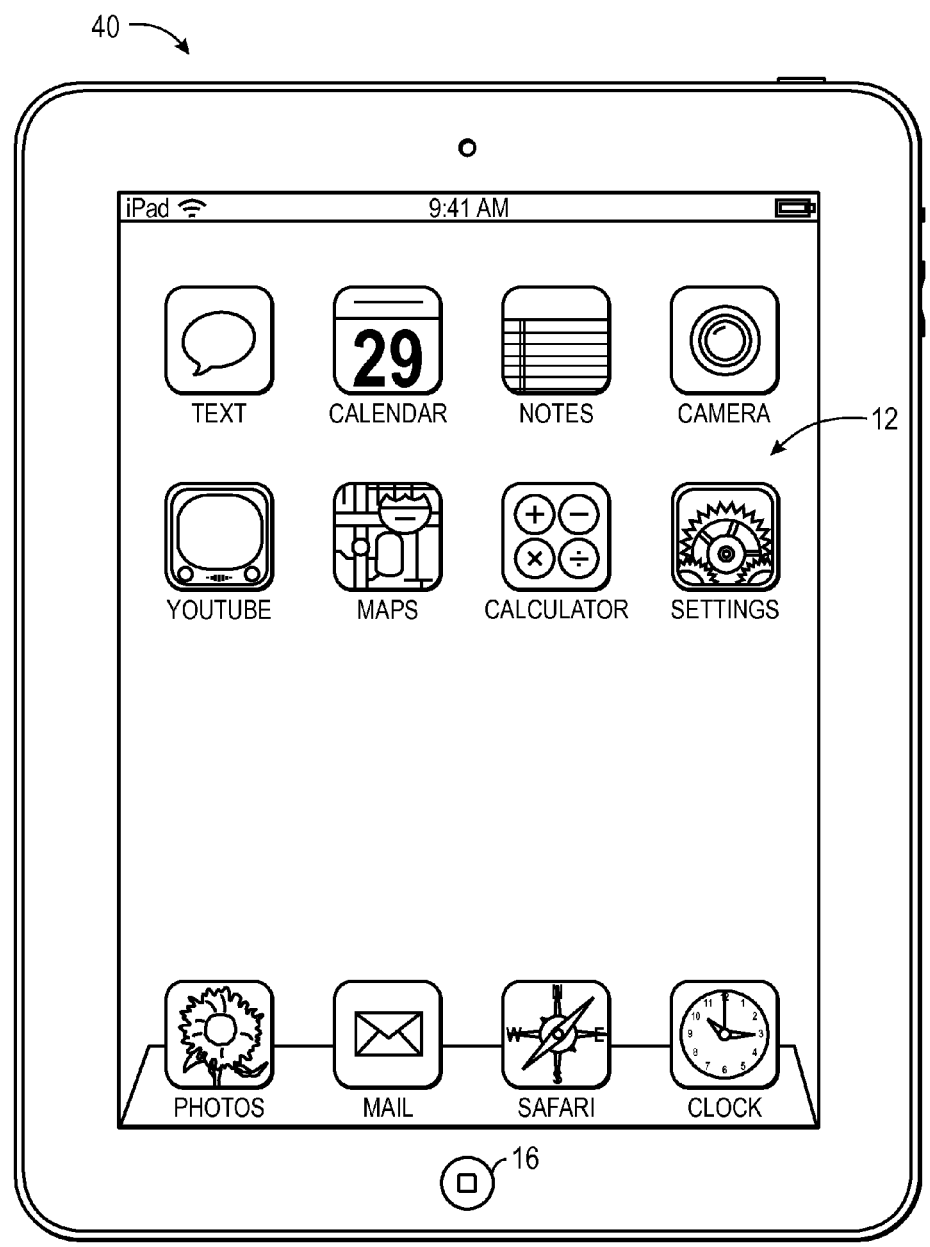
FIG. 3 is a front view of a tablet electronic device, in accordance with an embodiment.

With the foregoing in mind, FIG. 2 and FIG. 3 illustrate an electronic device 10 in the form of a handheld device 34 and a tablet device 40, respectively. FIG. 2 illustrates a cellular telephone, but it should be noted that while the depicted handheld device 34 is provided in the context of a cellular telephone, other types of handheld devices (such as media players for playing music and/or video, personal data organizers, handheld game platforms, and/or combinations of such devices) may also be suitably provided as the electronic device 10. As discussed with respect to the general electronic device 10 of FIG. 1, the handheld device 34 and the tablet device 40 may allow a user to connect to and communicate through the Internet or through other networks, such as local or wide area networks. The handheld electronic device 34 and the tablet device 40, may also communicate with other devices using short-range connections, such as Bluetooth® and near field communication. By way of example, the handheld device 34 may be a model of an iPod® or iPhone® available from Apple Inc. of Cupertino, Calif. Similarly, by way of example, the tablet device 40 may be a model of an iPad® from Apple Inc. of Cupertino, Calif.

The handheld device 34 and the tablet device 40 include an enclosure or body that protects the interior components from physical damage and shields them from electromagnetic interference. The enclosure may be formed from any suitable material such as plastic, metal or a composite material and may allow certain frequencies of electromagnetic radiation to pass through to wireless communication circuitry within the handheld device 34 and the tablet device 40 to facilitate wireless communication. In the depicted embodiment, the enclosure includes user input structures 16 through which a user may interface with the device. Each user input structure 16 may be configured to help control a device function when actuated.

In the depicted embodiment, the handheld device 34 and the tablet device 40 include the display 12. The display 12 may be a touch-screen LCD used to display a graphical user interface (GUI) that allows a user to interact with the handheld device 34 and the tablet device 40. The handheld electronic device 34 and the tablet device 40 also may include various input and output (I/O) ports that allow connection of the handheld device 34 and the tablet device 40 to external devices.

Figure 4:
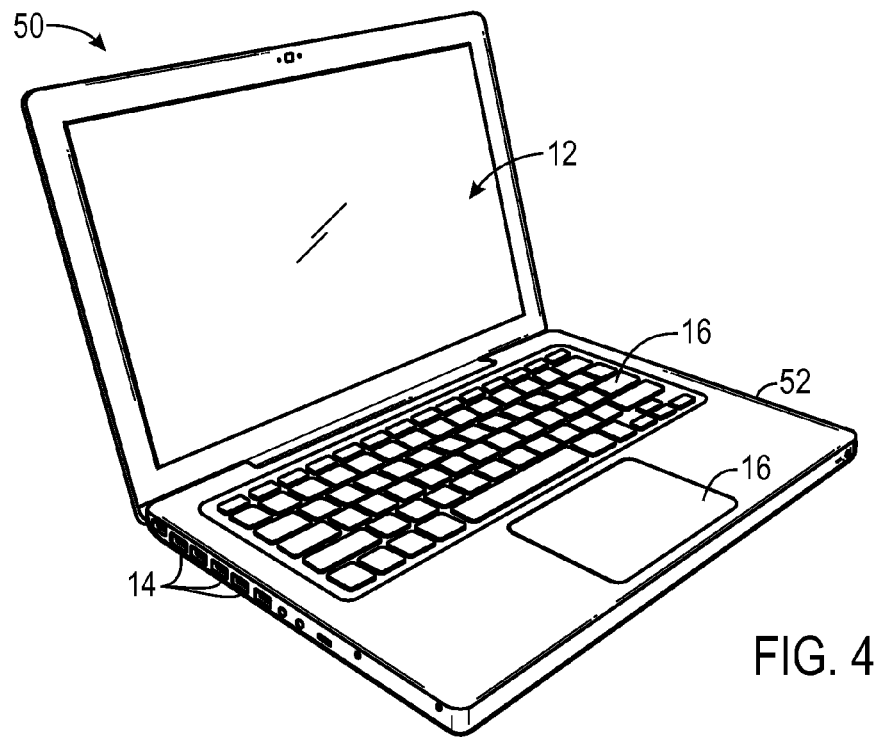
FIG. 4 is a view of a computer, in accordance with an embodiment.

In addition to handheld device 34 and the tablet device 40, the electronic device 10 may also take the form of a computer or other type of electronic device. Such computers may include computers that are generally portable (such as laptop, notebook, and tablet computers) as well as computers that are generally used in one place (such as conventional desktop computers, workstations, and/or servers). In certain embodiments, the electronic device 10 in the form of a computer may be a model of a MacBook®, MacBook® Pro, MacBook Air®, iMac®, Mac® mini, iPad® or Mac Pro® available from Apple Inc. By way of example, an electronic device 10 in the form of a laptop computer 50 is illustrated in FIG. 4 in accordance with one embodiment. The depicted computer 50 includes a housing 52, a display 12, input structures 16, and input/output ports 14.

In one embodiment, the input structures 16 (such as a keyboard and/or touchpad) may be used to interact with the computer 50, such as to start, control, or operate a GUI or applications running on the computer 50. For example, a keyboard and/or touchpad may allow a user to navigate a user interface or application interface displayed on the display 12.

As depicted, the electronic device 10 in the form of the computer 50 may also include various input and output ports 14 to allow connection of additional devices. For example, the computer 50 may include an I/O port 14, such as a USB port or other port, suitable for connecting to another electronic device, a projector, a supplemental display, and so forth. The computer 50 may include network connectivity, memory, and storage capabilities, as described with respect to FIG. 1. As a result, the computer 50 may store and execute a GUI and other applications.

Figure 5:
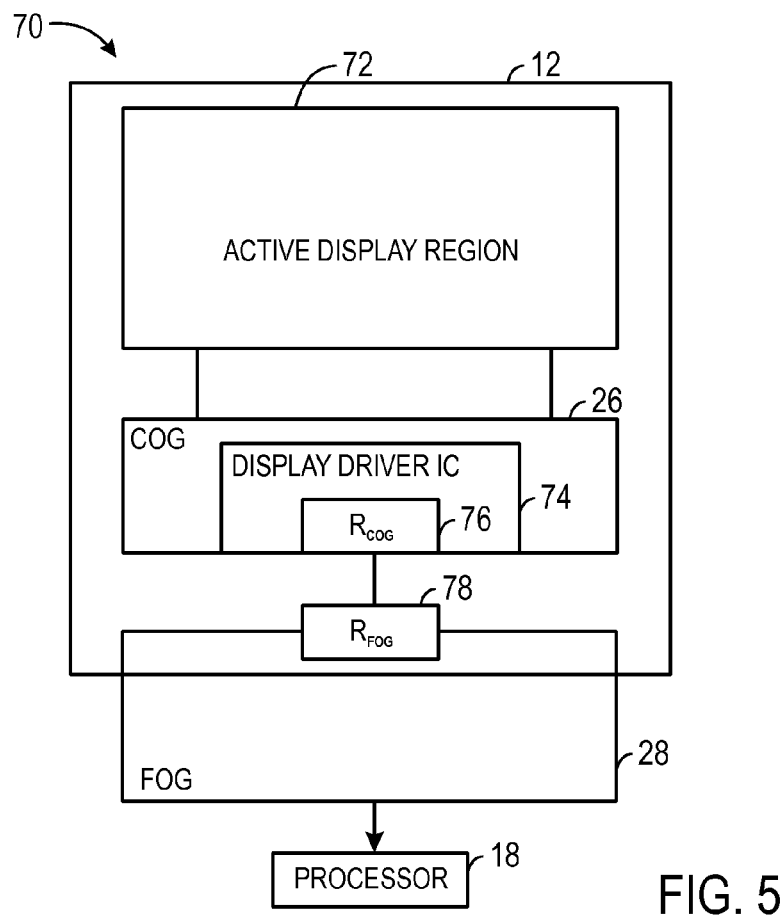
FIG. 5 is a block diagram of a display in the electronic device of FIG. 1, in accordance with an embodiment.

With the foregoing discussion in mind, FIG. 5 depicts a block diagram 70 of the display 12 in the electronic device 10. As shown in FIG. 5, the display 12 includes an active display region 72, the chip on glass (COG) circuit 26, and the flex on glass (FOG) circuit 28. The COG circuit 26 may be directly coupled to a glass layer of the active display region 72. The COG circuit 26 includes a display driver integrated circuit (IC) 74 that is coupled in series with the COG circuit 26 and the FOG circuit 78. The FOG circuit 78 is a flexible printed circuit (FPC) coupled on one end to the glass layer of the active display region 72.

The COG circuit 26 and the FOG circuit 28 may include a COG resistance 76 and a FOG resistance 78, respectively. The COG resistance 76 is a measure of internal contact resistance between the COG circuit 26 and the glass layer of the active display region 72. Similarly, the FOG resistance 78 is a measure of internal contact resistance between the FOG circuit 28 and the glass layer of the active display region 72. As the display 12 ages, the COG resistance 76 and the FOG resistance 78 may vary significantly. In some cases, these significant variations in the COG resistance 76 and the FOG resistance 78 may cause the display 12 to perform abnormally, display artifacts, and the like. By monitoring the COG resistance 76 and the FOG resistance 78 over time, electronic device manufacturers may assess the quality and reliability of the display 12 (e.g., LCD panel) over time. Accordingly, this information may prove useful in evaluating the manufacturers of the display 12.

Figure 6:
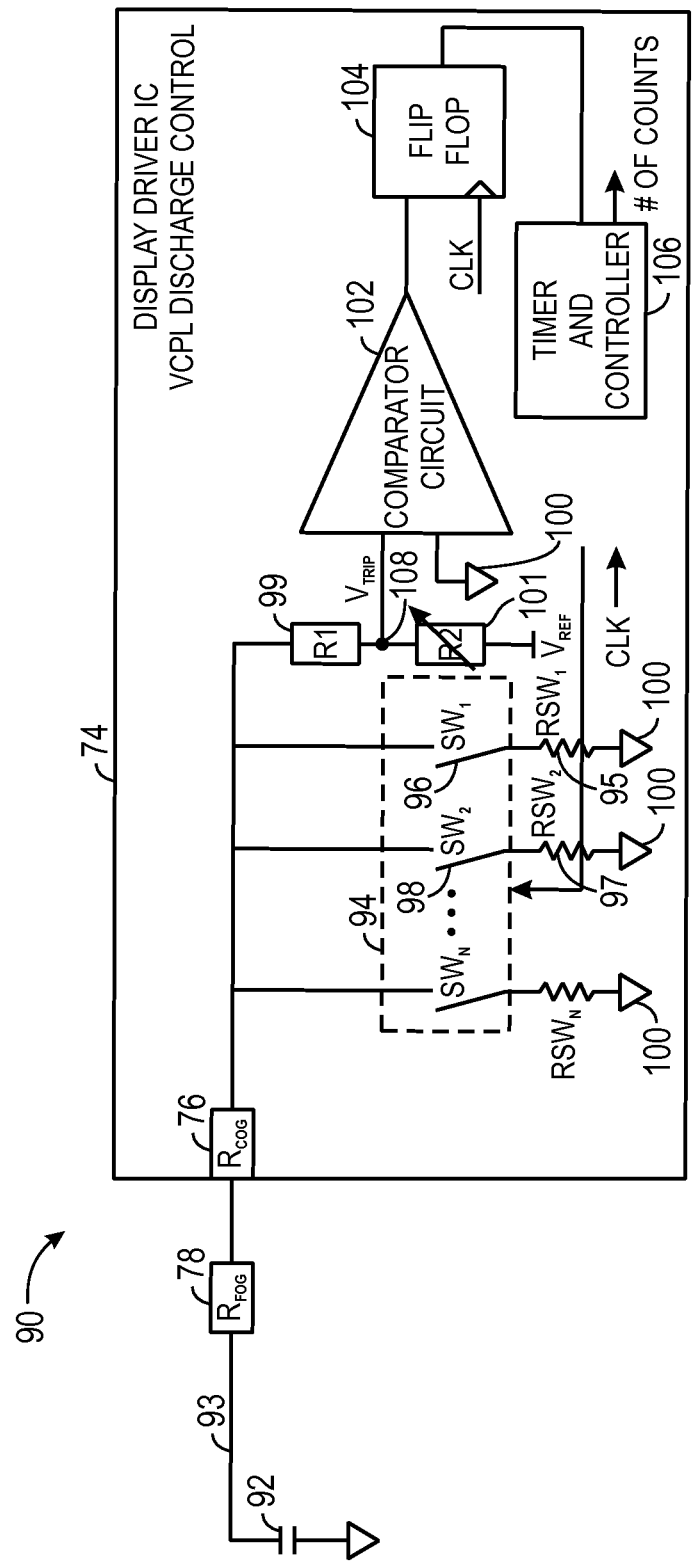
FIG. 6 is a block diagram of a display driver integrated circuit (IC) in the display of FIG. 5, in accordance with an embodiment.

In one embodiment, the circuitry of the display driver IC 74 may be used to determine the COG resistance 76 and the FOG resistance 78 over time. FIG. 6 depicts a block diagram 90 of the display driver IC 74. As shown in FIG. 6, the display driver IC 74 may include the COG resistance ($R_{COG}$) 76, the FOG resistance ($R_{FOG}$) 78, a capacitor 92, a supply rail 93, a number of switches 94 (e.g., switch 96 and switch 98), a resistor 99, ground 100, a variable resistor 101, a comparator circuit 102, a flip flop circuit 104, and a timer/controller circuit 106. The COG resistance 76, the FOG resistance 78, and the capacitor 92 are coupled to the display driver IC 74 via the supply rail 93. As mentioned above, to simultaneously display image data and detect touches, the display 12 may frequently alternate between a display period mode (e.g., when a frame of image data is rendered on the active display region 72) and touch period mode (e.g., when the active display region 72 detects touch inputs). The display period and touch period modes for the LCD panel may be characterized by two different sets of voltages applied to the active display region 72 of the LCD panel via two supply rails (e.g., high and low).

Figure 7:
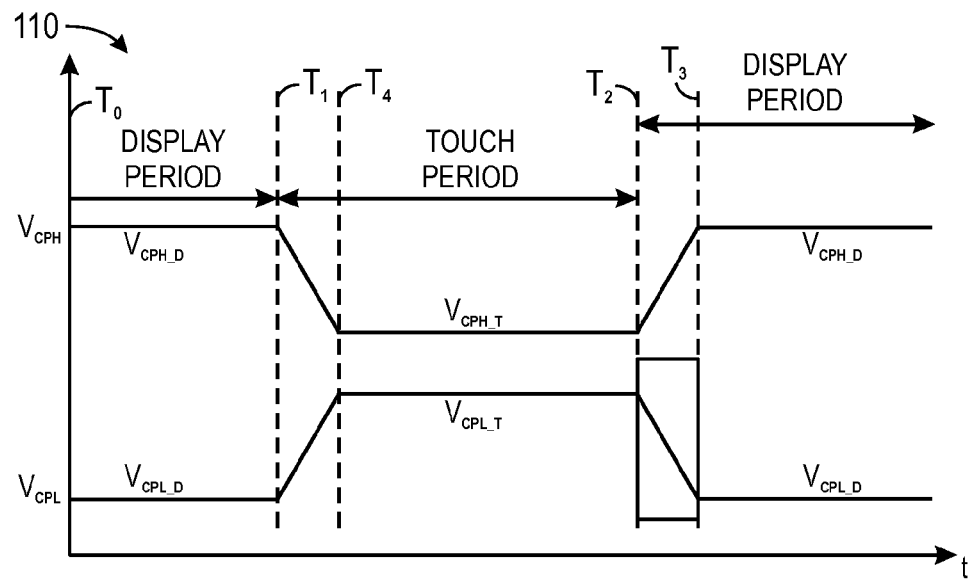
FIG. 7 is a graph of supply rail voltages over time as controlled by the display driver IC of FIG. 6, in accordance with an embodiment.

Keeping this in mind, FIG. 7 depicts an example of a graph 110 depicting how the voltages on a low voltage supply rail ($V_{CPL}$) and a high voltage supply rail ($V_{CPH}$) may change between display periods and touch periods. Referring to the graph 110, between time $T_0$ and time $T_1$, the voltages on the low and high supply rails are set to a display period voltage value (e.g., $V_{CPL\_D}$, $V_{CPH\_D}$). At time $T_1$, the voltage on each supply rail changes to touch period voltage values (e.g., $V_{CPL\_T}$, $V_{CPH\_T}$) until time $T_2$. Between time $T_2$ and time $T_3$, the voltage on the low voltage supply rail (e.g., supply rail 93) decreases back to the display period voltage $V_{CPL\_D}$. In one embodiment, the voltage drop that occurs between time $T_2$ and time $T_3$ is caused by discharging the capacitor 92. The capacitor 92 may be discharged by closing one of the switches 94, thereby coupling the capacitor 92 to ground 100. The display driver IC 74 may include a number of switches 94 such that the display driver IC 74 may couple to a variety of types of the display 12 produced by a variety of manufacturers. That is, each different manufacturer of the display 12 may specify a different switch resistance with which the capacitor 92 should be discharged. As such, the display driver IC 74 may include a number of switches 94 that have a number of different resistance values such that a single display driver IC 74 may be compatible with a number of different types of displays 12.

In one embodiment, the COG resistance 76 and the FOG resistance 78 may be determined based on discharge waveforms that correspond to when the capacitor 92 on the supply rail 93 (i.e., low voltage supply rail) is discharged using different switches 94 between time $T_2$ and time $T_3$. For instance, the capacitor 92 may be discharged from the touch period voltage to the display period voltage using a first switch (e.g., switch 96) during a first discharge cycle and using a second switch (e.g., switch 98) during a second discharge cycle. The processor 18 may compare the two discharge waveforms and determine the COG resistance 76 and the FOG resistance 78 based on the two discharge waveforms. Various methods in which the processor 18 may determine the COG resistance 76 and the FOG resistance 78 of the display 12 is described below with reference to FIGS. 8-16.

Although the methods below are described with reference to when the capacitor 92 discharges on the low voltage supply rail between time T2 and time T3, it should be noted that the methods described below may also be performed on the high voltage supply rail between time $T_1$ and time $T_4$, when the capacitor on the high voltage supply rail is discharged between the display period and the touch period.

Some of the methods described below, which may be used to determine the COG resistance 76 and the FOG resistance 78, may be based on a voltage response of the capacitor 92 in the display driver IC 74 as it discharges. For example, it is well known that for a resistor-capacitor (RC) circuit like that of the display driver IC 74, that the voltage at the capacitor (e.g., capacitor 92) will follow the following equation:

$$V_C = V_0 * \exp(-t/RC) \qquad (1)$$

where $V_C$ is the instantaneous voltage at the capacitor of the RC circuit, $V_0$ is the initial voltage at the capacitor of the RC circuit, t is an amount of time for the capacitor to discharge from voltage $V_0$ to voltage VC, R is the resistance of the RC circuit, and C is the capacitance of the capacitor of the RC circuit.

Keeping Equation 1 in mind, the COG resistance 76 and the FOG resistance 78 of the display 12 may be determined based on how the voltage at the capacitor 92 in the display driver IC 74 changes as it discharges. That is, the display driver IC 74 may correspond to an RC circuit having a total resistance that includes the COG resistance 76, the FOG resistance 78, and a resistance ($R_{SW}$) of a resistor in series with a switch used to discharge the capacitor. Further, the display driver IC 74 may correspond to an RC circuit having a total capacitance equal to the capacitance value of the capacitor 92. In this manner, Equation 1 may be applied to the display driver IC 74 and may be characterized as follows:

$$V_C = V_0 * \exp(-t/(R_{COG}+R_{FOG}+R_{SW})*C) \qquad (2)$$

$$t = -\ln(V_C/V_0)*(R_{COG}+R_{FOG}+R_{SW})*C \qquad (3)$$

$$R_{COG}+R_{FOG}+R_{SW} = t/C/(-\ln(V_C/V_0)) \qquad (4)$$

where $V_C$ is the instantaneous voltage at the capacitor 92, $V_0$ is the initial voltage at the capacitor 92, $R_{COG}$ is the COG resistance 76, $R_{FOG}$ is the FOG resistance 78, and $R_{SW}$ is the total resistance of the switch in series with the resistor used to discharge the capacitor 92.

Figure 8:
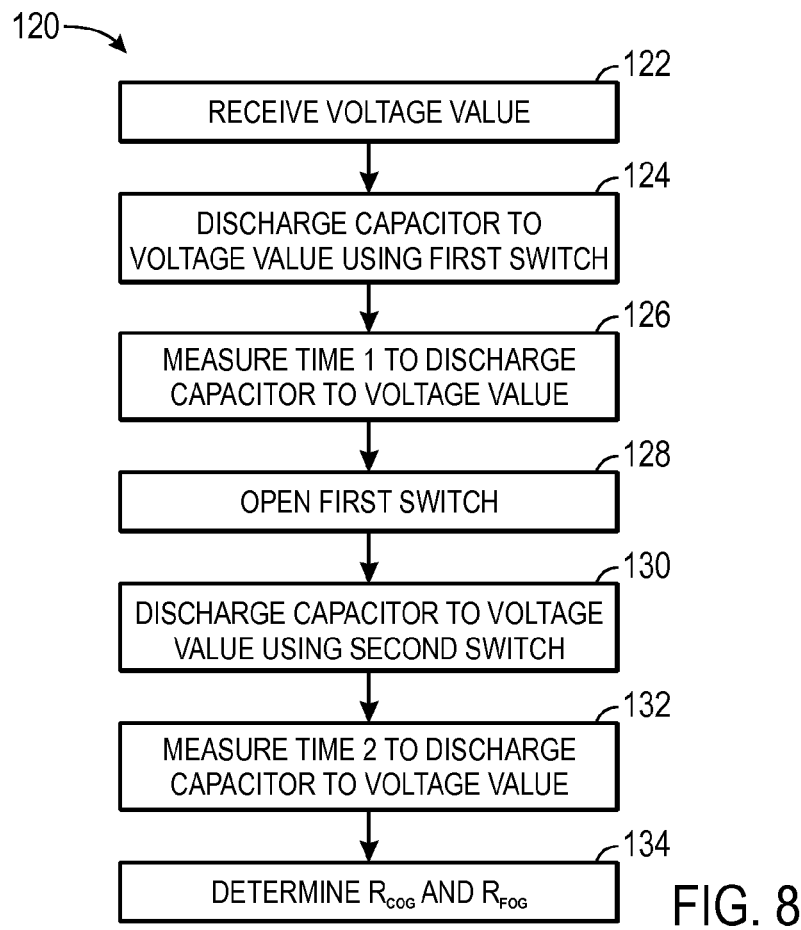
FIG. 8 is a flow chart that depicts a method for determining a chip on glass (COG) resistance value and a flex on glass (FOG) resistance value in the display of FIG. 5 using a single voltage value, in accordance with an embodiment.

In one embodiment, a method 120 (FIG. 8) for determining the COG resistance 76 and the FOG resistance 78 of the display 12 may be based on the voltage response of the capacitor 92 as described above in Equations 2-4. The following description of the method 120 is provided with reference to the display driver IC 74 of FIG. 6 and the low voltage supply rail curve ($V_{CPL}$) in the graph 110 of FIG. 7. Referring now to FIG. 8, at block 122, the processor 18 may receive a voltage value ($V_1$), which may be a voltage value between the initial voltage $V_0$ of the capacitor 92 (e.g., touch period voltage) and the display period voltage (i.e., between time $T_2$ and time $T_3$) or the display period voltage.

At block 124, the processor 18 may discharge the capacitor 92 to the voltage value $V_1$ received at block 122 using a first switch (e.g., switch 96) via a first resistor (e.g., resistor 95). For example, the processor 18 may close the switch 96, thereby coupling the capacitor 92 to ground 100 via a first resistor (e.g., resistor 95) and discharging the capacitor 92.

The processor 18 may then, at block 126, measure a time ($t_1$) it takes for the capacitor 92 to discharge from its initial voltage value $V_0$ to the voltage value $V_1$. To measure the time $t_1$, the processor 18 may adjust the variable resistor 101 of the display driver IC 74 such that the comparator 102 changes its state when the voltage of the capacitor 92 reaches the voltage value $V_1$. The comparator circuit 102 may change states when a voltage ($V_{trip}$) at node 108 becomes greater than zero. As such, the processor 18 may adjust the resistance of the variable resistor 101 such that the voltage at node 108 is sufficient to cause the comparator circuit 102 to switch states (i.e., trip) when the voltage of the capacitor 92 reaches the voltage value $V_1$.

After the comparator circuit 102 changes states, the processor 18 may then calculate the time $t_1$ for the capacitor 92 to discharge from its initial voltage value $V_0$ to the voltage value $V_1$ based on a number of counts between when the switch 96 was closed and when the comparator 102 changed states, as determined by the timer/controller circuit 106. That is, once the comparator 102 changes states, the flip flop circuit 104 may provide an output signal to the timer/controller circuit 106 indicating that the comparator circuit 102 changed states. In one embodiment, the timer/controller circuit 106 may also receive an input from an accurate and high-speed clock such that it may keep an accurate track of time between when the comparator circuit 102 changes states in the form of counts.

The timer/controller 106 may also control the operation of each of the switches 94. As such, at block 128, after the processor 18 determines that the capacitor 92 has reached the voltage value $V_1$, the processor 18 may open the switch 96 via the timer/controller circuit 106.

Figure 9:
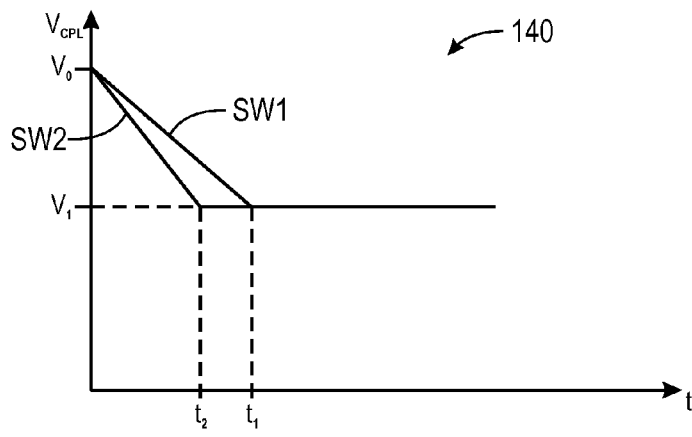
FIG. 9 is a graph of a supply rail voltage over time that corresponds with the method of FIG. 8, in accordance with an embodiment.
Figure 10:
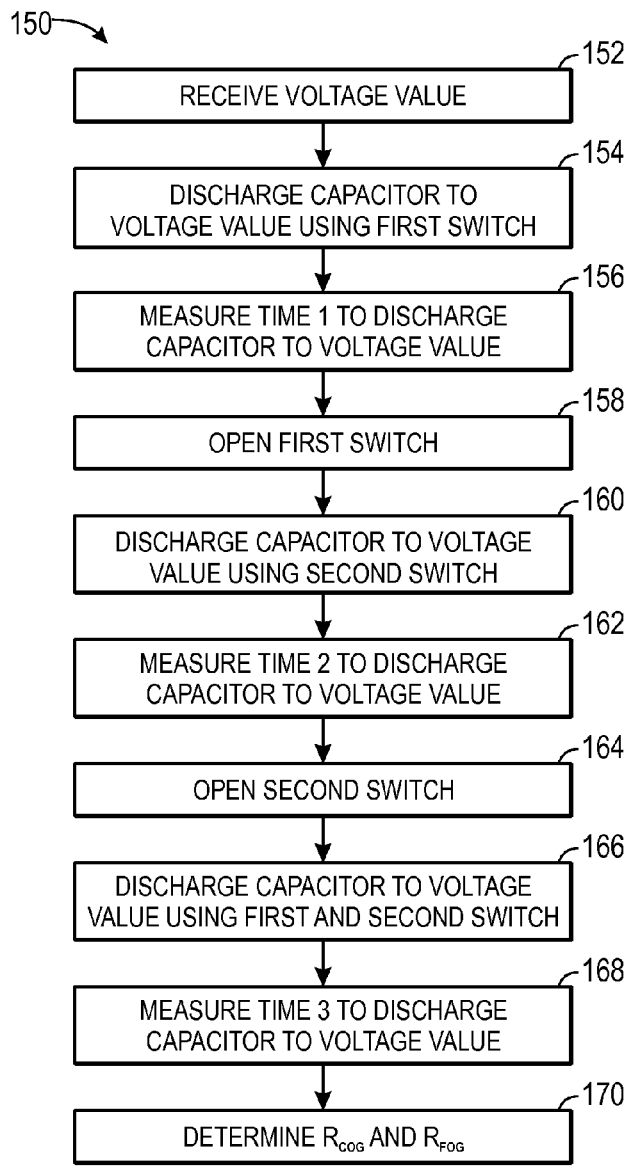
FIG. 10 is a flow chart that depicts a method for determining a chip on glass (COG) resistance value and a flex on glass (FOG) resistance value in the display of FIG. 5 using a single voltage value and at least two switches, in accordance with an embodiment.

At block 130, after the capacitor 92 has been recharged to its initial voltage value $V_0$, the processor 18 may discharge the capacitor 92 to the voltage value $V_1$ using a second switch (e.g., switch 98), which may be coupled in series with a second resistor (e.g., resistor 97). The processor 18 may then, at block 132, measure a time ($t_2$) for the capacitor 92 to discharge from its initial voltage value $V_0$ to the voltage value $V_1$ using a similar process as described above. In one embodiment, the resistance of the resistor 97 may be smaller than the resistance of the resistor 95. As such, the time $t_2$ for the capacitor 92 to discharge to the voltage value $V_1$ using the switch 98 may be smaller than the time $t_1$ for the capacitor 92 to discharge to the voltage value $V_1$ using the switch 96. FIG. 9 illustrates a graph 140 that depicts how the capacitor 92 may discharge using the switch 96 (SW1) and the switch 98 (SW2).

Using the two times (i.e., $t_1$ and $t_2$) for the capacitor 92 to discharge from the initial voltage value $V_0$ to the voltage value $V_1$, the processor 18, at block 134, may determine values for the COG resistance 76 and the FOG resistance 78 using the voltage response of the capacitor 92, as shown in Equations 2-4. That is, since the initial voltage value $V_0$, the voltage value $V_1$, the capacitance of the capacitor 92, the times $t_1$ and $t_2$, and the resistance of each resistor (e.g., resistor 95 and resistor 97) are known, the processor 18 may generate two equations based on Equation 4 to determine the unknown resistance value for the sum of $R_{COG}$ and $R_{FOG}$. For instance, Equation 4 mayv be written based on the above information as follows:

$$R_{COG}+R_{FOG}+R_{SW1}=t_1/C/(-\ln(V_1/V_0)) \quad (5)$$

$$R_{COG}+R_{FOG}+R_{SW2}=t_2/C/(-\ln(V_1/V_0)) \quad (6)$$

The processor 18 may then use Equations 5-6 to solve for the sum of $R_{COG}$ and $R_{FOG}$, thereby monitoring the values of the COG resistance 76 and the FOG resistance 78 after the display 12 has been assembled into its respective electronic device 10. In one embodiment, the processor 18 may periodically perform the method 120 to determine the values of the COG resistance 76 and the FOG resistance 78 over time as the display 12 ages. As such, the processor 18 may store logs that include the values of the COG resistance 76 and the FOG resistance 78 over time. The processor 18 may also send the logs of the COG resistance 76 and the FOG resistance 78 values to a server for review by the manufacturer of the electronic device 10, the manufacturer of the display 12, or the like. In this manner, the performance of the display 12 may be monitored over time. The logs of the COG resistance 76 and the FOG resistance 78 values over time may be useful in comparing the performances of various types of the display 12, which may be produced by different manufacturers. Further, the processor 18 may determine the COG resistance 76 and the FOG resistance 78 values at any time after the display 12 has been placed in its respective product without the use of a separate non-functioning glass.

In certain embodiments, the method 120 may be modified to improve the accuracy of the values of the COG resistance 76 and the FOG resistance 78. That is, the method 120 may be modified such that the calculated values of the COG resistance 76 and the FOG resistance 78 may account for a matching error between each resistor (e.g., resistor 95 and resistor 97) coupled in series with each switch (e.g., switch 96 and switch 98). For instance, if the resistor 97 ($R_{SW2}$) was selected to have a resistance value that was half of the resistance value of the resistor 95 ($R_{SW1}$), Equations 5 and 6 may be modified to account for the matching error ($\epsilon$) between the resistor 97 and the resistor 95 as shown below in Equations 7-10.

$$R_{SW1}=R \quad (7)$$

$$R_{SW2}=X*R*(1+\epsilon)=0.5*R*(1+\epsilon) \quad (8)$$

$$R_{COG}+R_{FOG}=-R+t_1/[C*\ln(V_0/V_1)] \quad (9)$$

$$R_{COG}+R_{FOG}=-(0.5)*R*(1+\epsilon)+t_2/[C*\ln(V_0/V_1)] \quad (10)$$

where $V_1$ is a target voltage for the capacitor 92, $V_0$ is the initial voltage at the capacitor 92, $R_{COG}$ is the COG resistance 76, $R_{FOG}$ is the FOG resistance 78, $R_{SW1}$ is the resistance of the resistor 95, $R_{SW2}$ is the resistance of the resistor 95, R is a resistance value, and X is a ratio of a resistance value of the resistor 97 to the resistance value of the resistor 95.

The matching error ($\epsilon$) between each resistor may depend on various factors such as the manner in which each resistor is arranged or laid out next to each other on the display driver IC 74 and the like. By taking the matching error ($\epsilon$) into account, Equations 9-10 may determine a more accurate range of values for the COG resistance 76 and the FOG resistance 78. Combining Equations 9 and 10 may result in Equation 11, which may be simplified using Equation 12 into Equation 13 as shown below.

$$R_{COG}+R_{FOG}=-\epsilon*R+(2*t_2-t_1)/[C*\ln(V_0/V_1)] \quad (11)$$

$$\Delta t=(2*t_2-t_1) \quad (12)$$

$$R_{COG}+R_{FOG}=-\epsilon*R+\Delta t/[C*\ln(V_0/V_1)] \quad (13)$$

By way of example, if the resistance value R was equal to 800 Ohms and the matching error ($\epsilon$) was equal to ±0.5%, Equation 13 may determine that the matching error ($\epsilon$) may result in the accuracy of the calculated values for the COG resistance 76 and the FOG resistance 78 to vary from the actual values for the COG resistance 76 and the FOG resistance 78 by a range between −4 Ohms (i.e., −$\epsilon$*R=−0.005*800) and +4 Ohms (i.e., −$\epsilon$*R=0.005*800). Keeping this in mind, the sensitivity of the calculated values for the COG resistance 76 and the FOG resistance 78 with regard to the matching error ($\epsilon$) may be reduced by modifying the method 120 as described below with reference to FIG. 10.

Referring again to FIG. 6, in one embodiment, the resistance of each resistor $R_{SWN}$ may be selected to have substantially the same resistance value. Keeping this in mind and referring to FIG. 10, blocks 152-162 may correspond to blocks 122-132 of the method 120 in FIG. 8. Assuming that the resistance values of the resistor 95 and the resistor 97 are substantially the same, and taking the matching error ($\epsilon$) between the resistor 95 and the resistor 97 into account, the processor 18 may determine two times (i.e., $t_1$ and $t_2$) for the capacitor 92 to discharge from the initial voltage value $V_0$ to the voltage value $V_1$ once through the resistor 95 and once through the resistor 97 according to Equations 14-17 below.

$$R_{SW1} = R \tag{14}$$

$$R_{SW2} = R^*(1+\epsilon) \tag{15}$$

$$t_1 = [R_{COG} + R_{FOG} + R]^*C^*\ln(V_0/V_1) \tag{16}$$

$$t_2 = [R_{COG} + R_{FOG} + R^*(1+\epsilon)]^*C^*\ln(V_0/V_1) \tag{17}$$

Combining Equations 16 and 17 may result in Equation 18, which may be simplified using Equation 19 into Equation 20, as shown below.

$$(t_1+t_2)/2 = [R_{COG} + R_{FOG} + R^*(1+\epsilon/2)]^*C^*\ln(V_0/V_1) \tag{18}$$

$$T1 = (t_1+t_2)/2 \tag{19}$$

$$T1 = [R_{COG} + R_{FOG} + R^*(1+\epsilon/2)]^*C^*\ln(V_0/V_1) \tag{20}$$

Keeping the foregoing in mind, at block 164, the processor 18 may open the switch 98 via the timer/controller circuit 106. After the capacitor 92 has been recharged to its initial voltage value $V_0$, the processor 18 may, at block 166, discharge the capacitor 92 to the voltage value $V_1$ using the first switch (e.g., switch 96), which may be coupled in series with the first resistor (e.g., resistor 95), and the second switch (e.g., switch 98), which may be coupled in series with a second resistor (e.g., resistor 97). That is, the processor 18 may close the switch 96 and the switch 98 and discharge the capacitor 92 via the resistor 95 and the resistor 97, which may now be coupled in parallel since both the switch 96 and the switch 98 are closed.

At block 168, the processor 18 may measure a time (T2) for the capacitor 92 to discharge from its initial voltage value $V_0$ to the voltage value $V_1$ using Equations 21-22 shown below.

$$T2 = [(R_{COG} + R_{FOG}) + R_{SW1} \| R_{SW2}]^*C^*\ln(V_0/V_1) \tag{21}$$

$$T2 = [R_{COG} + R_{FOG} + 0.5^*R^*(1+\epsilon)/(1+\epsilon/2)]^*C^*\ln(V_0/V_1)] \tag{22}$$

At block 170, the processor 18 may determine values for the COG resistance 76 and the FOG resistance 78 using the voltage response of the capacitor 92, as shown in Equations 20 and 22. That is, since the initial voltage value $V_0$, the voltage value $V_1$, the capacitance of the capacitor 92, the times T1 and T2, and the resistance of each resistor (e.g., resistor 95 and resistor 97) are known, the processor 18 may combine Equations 20 and 22 as shown in Equation 23 to determine the two unknown resistance values for the COG resistance 76 and the FOG resistance 78. Equation 23 may be simplified using Equation 24 into Equations 25 and 26 as shown below.

$$2^*T2 - T1 = [R_{COG} + R_{FOG} - R^*(\epsilon^2/4)/(1+\epsilon/2)]^*C^*\ln(V_0/V_1) \tag{23}$$

$$\Delta T = (2^*T2 - T1) \tag{24}$$

$$\Delta T = [R_{COG} + R_{FOG} - R^*(\epsilon^2/4)/(1+\epsilon/2)]^*C^*\ln(V_0/V_1) \tag{25}$$

$$R_{COG} + R_{FOG} = (\epsilon^2/4)^*R + \Delta T/[C^*\ln(V_0/V_1)] \tag{26}$$

As shown in the Equation 26, the contribution of the resistance value (R) to the sum of the COG resistance 76 and the FOG resistance 78 may be relatively small since it is multiplied by a factor that includes the square of the matching error $\epsilon$. As such, the sum of the COG resistance 76 and the FOG resistance 78 may be determined without knowing the exact value for the resistance value (R). Instead, the sum of the COG resistance 76 and the FOG resistance 78 may be determined using an approximate value for the resistance value (R). That is, since the contribution of the resistance value (R) in determining the sum of the COG resistance 76 and the FOG resistance 78 may be relatively small using Equation 26, the determined value for the sum of the COG resistance 76 and the FOG resistance 78 using Equation 26 may be relatively accurate. The relative accuracy in determining the sum of the COG resistance 76 and the FOG resistance 78 using Equation 26 is illustrated in the example provided below.

Referring back to the example described above with reference to the method 120 and Equation 15, if the resistance value R was equal to 800 Ohms and the matching error ($\epsilon$) was equal to ±0.5%, Equation 26 may determine that the matching error ($\epsilon$) may result in the accuracy of the calculated values for the COG resistance 76 and the FOG resistance 78 to vary from the actual values for the COG resistance 76 and the FOG resistance 78 by a range between −0.005 Ohms (i.e., −($\epsilon^2$/4)*R=−0.005²*800) and +0.005 Ohms (i.e., +($\epsilon^2$/4)*R=0.005²*800). Accordingly, the method 150 may significantly reduce the sensitivity of the calculated values for the COG resistance 76 and the FOG resistance 78 with regard to the matching error ($\epsilon$) from ±4 Ohms (i.e., using method 120) to ±0.005 Ohms (i.e., using method 150).

Figure 11:
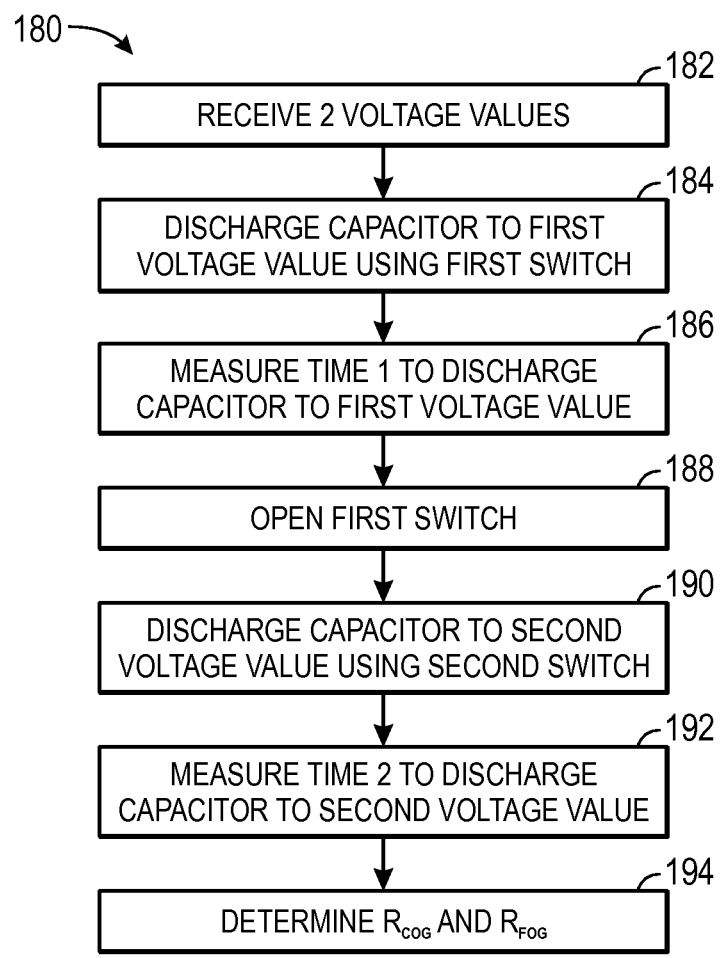
FIG. 11 is a flow chart that depicts a method for determining the COG resistance value and the FOG resistance value in the display of FIG. 5 using two voltage values, in accordance with an embodiment.

In addition to the method 120 and the method 150, the processor 18 may determine the COG resistance 76 and the FOG resistance 78 values employing a method 180 of FIG. 11. As such, at block 182, the processor 18 may receive two voltage values ($V_1$ and $V_2$), which may be voltages between the initial voltage $V_0$ of the capacitor 92 (i.e., touch period voltage) and the display period voltage (i.e., between time $T_2$ and time $T_3$) or the display period voltage.

At block 184, the processor 18 may discharge the capacitor 92 to the voltage value $V_1$ received at block 182 using a first switch (e.g., switch 96). That is, the processor 18 may close the switch 96, thereby coupling the capacitor 92 to ground 100 via the resistor 95 and discharging the capacitor 92.

The processor 18 may then, at block 186, measure a time ($t_1$) it takes for the capacitor 92 to discharge from the voltage value $V_0$ to the voltage value $V_1$. As mentioned above, to measure the time $t_1$, the processor 18 may adjust the variable resistor 101 of the display driver IC such that the comparator 102 changes state when the voltage of the capacitor 92 reaches the voltage value $V_1$. The processor may then calculate the time $t_1$ for the capacitor 92 to discharge from its initial voltage value $V_0$ to the voltage value $V_1$ based on a number of counts between when the switch 96 was closed and when the comparator 102 changed states, as determined by the timer/controller circuit 106. At block 188, after the processor 18 determines that the capacitor 92 has reached the voltage value $V_1$, the processor 18 may open the switch 96.

Figure 12:
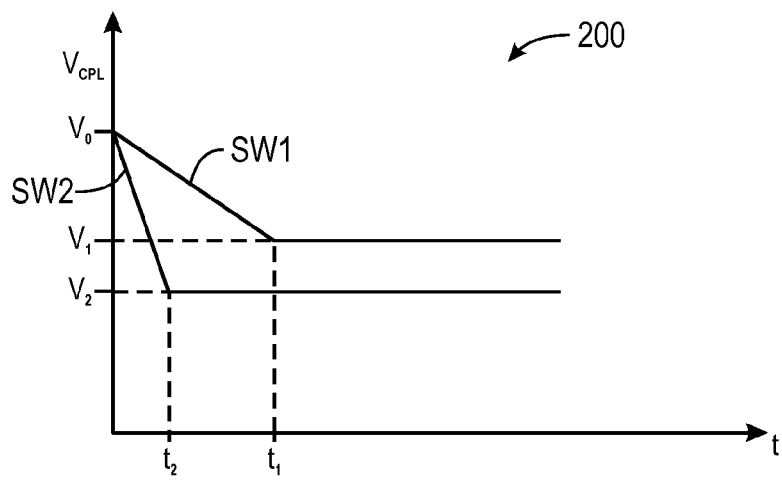
FIG. 12 is a graph of a supply rail voltage over time that corresponds with the method of FIG. 11, in accordance with an embodiment.

At block 190, after the capacitor 92 has been recharged to its initial voltage value $V_0$, the processor 18 may discharge the capacitor 92 to the voltage value $V_2$ using a second switch (e.g., switch 98) via the resistor 97. The processor 18 may then, at block 192, measure a time ($t_2$) for the capacitor 92 to discharge from its initial voltage value $V_0$ to the voltage value $V_2$ using a similar process as described above. In one embodiment, the resistance of the resistor 97 may be smaller than the resistor 95. As such, the time $t_2$ for the capacitor 92 to discharge to the voltage value $V_2$ using the switch 98 may be smaller than the time $t_1$ for the capacitor 92 to discharge to the voltage value $V_1$ using the switch 96. FIG. 12 illustrates a graph 200 that depicts how the capacitor 92 may discharge using the switch 96 (SW1) and the switch 98 (SW2) in accordance with method 180.

Using the two times (i.e., $t_1$ and $t_2$) for the capacitor 92 to discharge to the voltage value $V_1$ and the voltage value $V_2$, the processor 18, at block 194, may determine the COG resistance 76 and the FOG resistance 78 values using the voltage response of the capacitor 92. That is, since the initial voltage value $V_0$, the voltage value $V_1$, the voltage value $V_2$, the capacitance of the capacitor 92, the times $t_1$ and $t_2$, and the resistance of each switch (e.g., switch 96 and switch 98) are known, the processor 18 may generate two equations based on Equation 4 to determine the unknown resistance values of the sum of $R_{COG}$ and $R_{FOG}$. For instance, Equation 4 may be written based on the above information as follows:

$$R_{COG}+R_{FOG}+R_{SW1}=t_1/C/(-\ln(V_1/V_0)) \quad (27)$$

$$R_{COG}+R_{FOG}+R_{SW2}=t_2/C/(-\ln(V_2/V_0)) \quad (28)$$

The processor 18 may then use Equations 27-28 to solve for the sum of $R_{COG}$ and $R_{FOG}$, thereby monitoring the values of the COG resistance 76 and the FOG resistance 78 after the display 12 has been assembled into its respective electronic device 10. Like method 120, the processor 18 may periodically perform the method 180 to determine the values of the COG resistance 76 and the FOG resistance 78 over time as the display 12 ages, which may be useful in assessing the quality and durability of the display 12. Further, the processor 18 may send the COG resistance 76 and the FOG resistance 78 values to a server, which may be accessed by a display manufacturer, an electronic device manufacturer, or the like.

Keeping the foregoing in mind, the processor 18 may also determine the COG resistance 76 and the FOG resistance 78 values based on the initial voltage value $V_0$, the voltage value $V_1$, the voltage value $V_2$, the capacitance of the capacitor 92, the times $t_1$ and $t_2$, the resistance of each resistor (resistor 95 and resistor 97), and the voltage ($V_{trip}$) at the node 108 when the voltage value of the capacitor 92 is equal to the voltage value $V_1$ and the voltage value $V_2$. That is, since the voltage ($V_{trip}$) may be known based on the ratio of the resistance of the resistor 99 to the variable resistor 101 and the reference voltage value ($V_{ref}$), the voltage ($V_{trip}$) at the node 108 may be used to determine the COG resistance 76 and the FOG resistance 78 values according to the following equations:

$$V_{trip}=V_1*(R_{SW1}(R_{COG}+R_{FOG}+R_{SW1}) \quad (29)$$

$$R_{SW1}=(R_{COG}+R_{FOG})*V_{trip}/(V_1-V_{trip}) \quad (30)$$

$$R_{COG}+R_{FOG}=(1-V_{trip}*(-t_1/C/\ln(V_1/V_0)) \quad (31)$$

$$R_{COG}+R_{FOG}=(1-V_{trip}/V_2)*(-t_2/C/\ln(V_2/V_0)) \quad (32)$$

The processor 18 may then use Equations 31-32 to solve for the sum of $R_{COG}$ and $R_{FOG}$, thereby monitoring the values of the COG resistance 76 and the FOG resistance 78 after the display 12 has been assembled into its respective electronic device 10. As mentioned above, the processor 18 may periodically determine the COG resistance 76 and the FOG resistance 78 values over time as the display 12 ages, which may be useful in assessing the quality and durability of the display 12.

Figure 13:
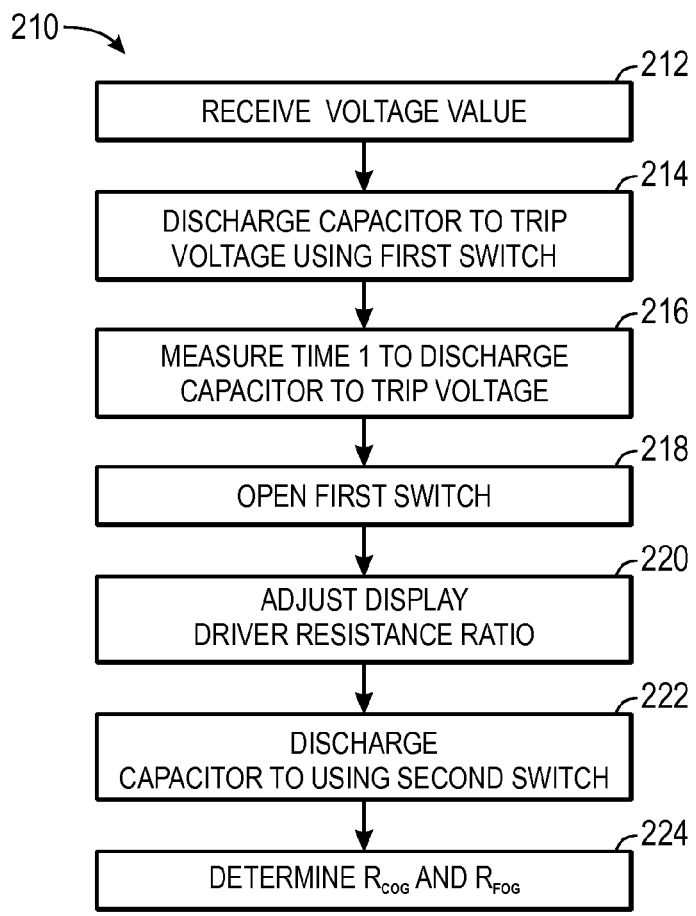
FIG. 13 is a flow chart that depicts a method for determining the COG resistance value and the FOG resistance value using various resistance ratios in the display driver IC of FIG. 6, in accordance with an embodiment.

In another embodiment, the processor 18 may determine the COG resistance 76 and the FOG resistance 78 values employing a method 210 of FIG. 13. As such, at block 212, the processor 18 may receive a voltage value ($V_1$), which may be a voltage between the initial voltage value $V_0$ of the capacitor 92 (e.g., touch period voltage) and the display period voltage (i.e., between time $T_2$ and time $T_3$) or the display period voltage.

At block 214, the processor 18 may discharge the capacitor 92 to the voltage value $V_1$ received at block 212 using a first switch (e.g., switch 96). That is, the processor 18 may close the switch 96, thereby coupling the capacitor 92 to ground 100 via the resistor 95 and discharging the capacitor 92.

The processor 18 may then, at block 216, measure a time ($t_1$) it takes for the capacitor 92 to discharge to the voltage value $V_1$. The processor may then calculate the time $t_1$ for the capacitor 92 to discharge from its initial voltage value $V_0$ to the voltage value $V_1$ based on a number of counts between when the switch 96 was closed and when the comparator circuit 102 changed states, as described above.

Figure 14:
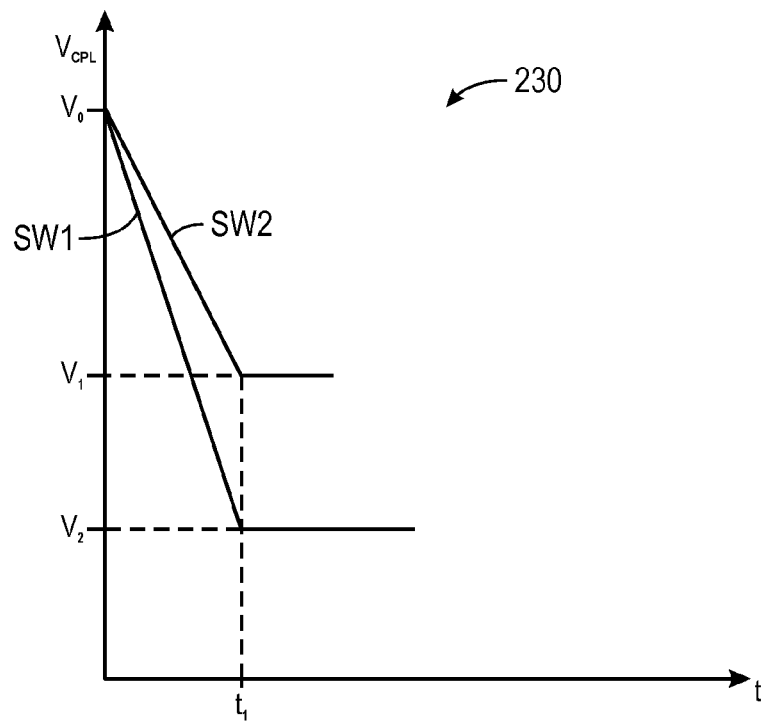
FIG. 14 is a graph of a supply rail voltage over time that corresponds with the method of FIG. 13, in accordance with an embodiment.

At block 218, the processor 18 may open the switch 96. After the capacitor 92 has been recharged to its initial voltage value $V_0$, at block 220, the processor 18 may adjust the variable resistor 101 to modify the trip voltage ($V_{trip}$) for the comparator 102 such that the comparator 102 changes states at time $t_1$ when the capacitor 92 is being discharged using a different switch (e.g., switch 98) (SW2). FIG. 14 illustrates a graph 230 that depicts how the capacitor 92 may discharge according to the method 210 using the resistor 95 and the resistor 97.

As indicated in the graph 230, the processor 18 may discharge the capacitor 92 using a second switch (e.g., switch 98) until time $t_1$ expires, at which time the comparator 102 switches states. In this manner, the capacitor 92 may discharge to voltage value $V_2$, as shown on the graph 230. Using the time ($t_1$), the voltage value $V_1$, and the voltage value $V_2$, the processor 18, at block 224, may determine the COG resistance 76 and the FOG resistance 78 values using the voltage response of the capacitor 92. That is, since the initial voltage value $V_0$, the voltage value $V_1$, the voltage value $V_2$, the capacitance of the capacitor 92, the time $t_1$, and the resistance of each resistor (resistor 95 and resistor 97) are known, the processor 18 may generate two equations based on Equation 4 to determine the unknown resistance value of the sum of $R_{COG}$ and $R_{FOG}$. For instance, Equation 4 may be written based on the above information as follows:

$$R_{COG}+R_{FOG}+R_{SW1}=t_1/C/(-\ln(V_1/V_0)) \quad (33)$$

$$R_{COG}+R_{FOG}+R_{SW2}=t_1/C/(-\ln(V_2/V_0)) \quad (34)$$

The processor 18 may use Equations 33-34 to solve for the sum of $R_{COG}$ and $R_{FOG}$, thereby monitoring the values of the COG resistance 76 and the FOG resistance 78 after the display 12 has been assembled into its respective electronic device 10. Like methods 120, 150, and 180, the processor 18 may periodically perform the method 210 to determine the COG resistance 76 and the FOG resistance 78 values over time as the display 12 ages, which may be useful in assessing the quality and durability of the display 12. Further, the processor 18 may send the COG resistance 76 and the FOG resistance 78 values to a server, which may provide access to the COG resistance 76 and the FOG resistance 78 values to other entities (e.g., manufacturer).

With regard to the methods 120, 150, 180, and 210 described above, it should be noted that in some embodiments, these methods may be performed using a display driver IC 74 that does not include resistors (e.g., resistor 95, resistor 97, etc.). That is, each switch $SW_N$ may be directly coupled to the ground 100. In this case, the processes and equations related to methods 120, 150, 180, and 210 may be performed by replacing the resistance values of each resistor $RSW_N$ with the resistance values of the switches $SW_N$ themselves. In certain embodiments, the switches may also have a matching error (c) associated with each other. As such, the processor 18 may account for the matching error (c) of each switch $SW_N$ using the method 150 described above.

Figure 15:
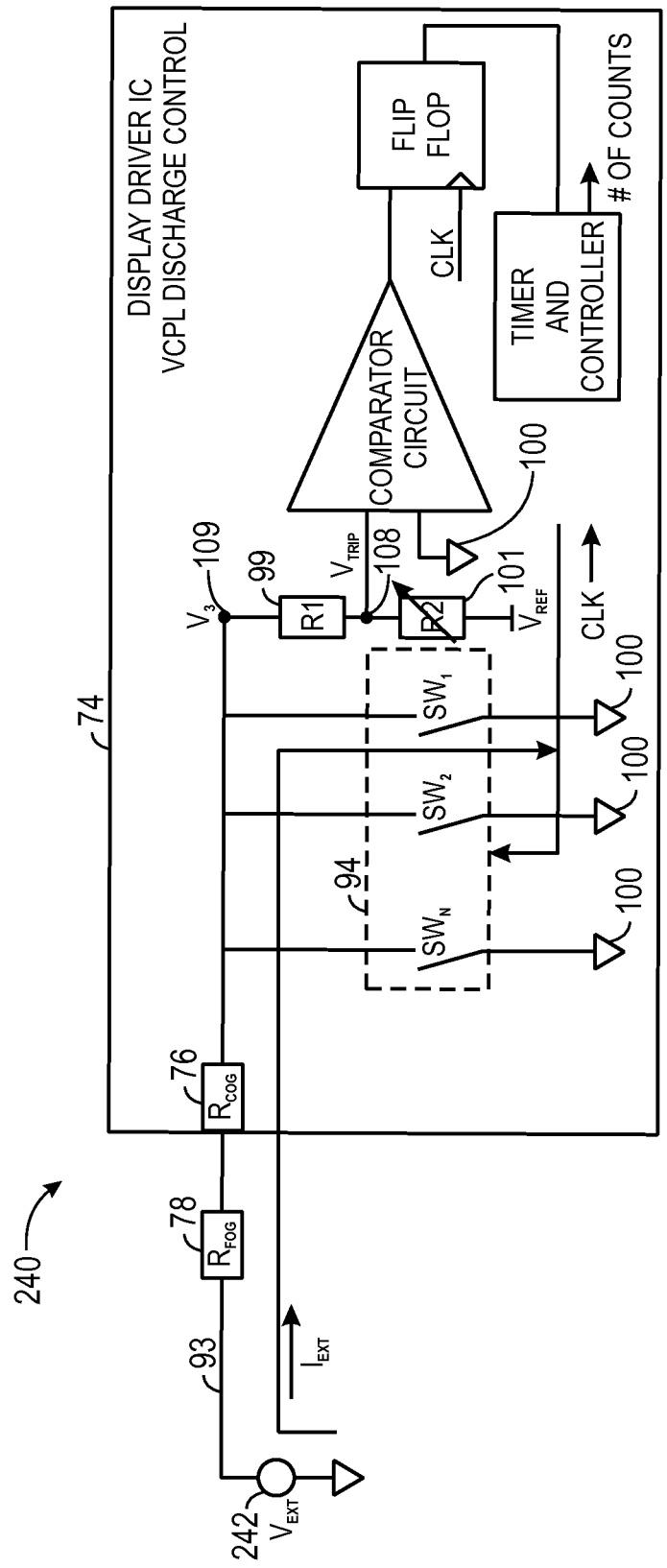
FIG. 15 is a block diagram of a display driver IC in the display of FIG. 5 that includes an external voltage supply, in accordance with an embodiment.

In yet another embodiment, an external direct current (DC) voltage source may replace the capacitor 92 of the display driver IC 74 as shown in block diagram 240 of FIG. 15. Here, an external voltage source 242 may be coupled to the supply rail 93 in series with the switches 94 and the resistor 99 and the variable resistor 101. In one embodiment, the external voltage source 242 may be disposed on the FOG circuit 28 and coupled to the supply rail 93 via test points (not shown). Since a voltage ($V_3$) at node 109 may be determined based on the reference voltage ($V_{REF}$) and a ratio of the resistor 99 and the variable resistor 101, the processor 18 may determine the total resistance of the COG resistance 76 and the FOG resistance 78 by applying Ohm's law, as shown in Equation 35 below:

$$R_{COG}+R_{FOG}=(V_{EXT}-V_3)/I_{EXT} \quad (35)$$

where $V_{EXT}$ is the DC voltage value of the external voltage source 242, $V_3$ is the voltage at the node 109 between the COG resistance 76 and the resistor 99 of the block diagram 210, and $I_{EXT}$ is the DC current on the supply rail 93. Although the resistor 99 has been described throughout this disclosure as a static resistor, it should be noted that in certain embodiments and for any method described herein, the resistor 99 and the variable resistor 101 may be a standard resistor or a variable resistor.

Figure 16:
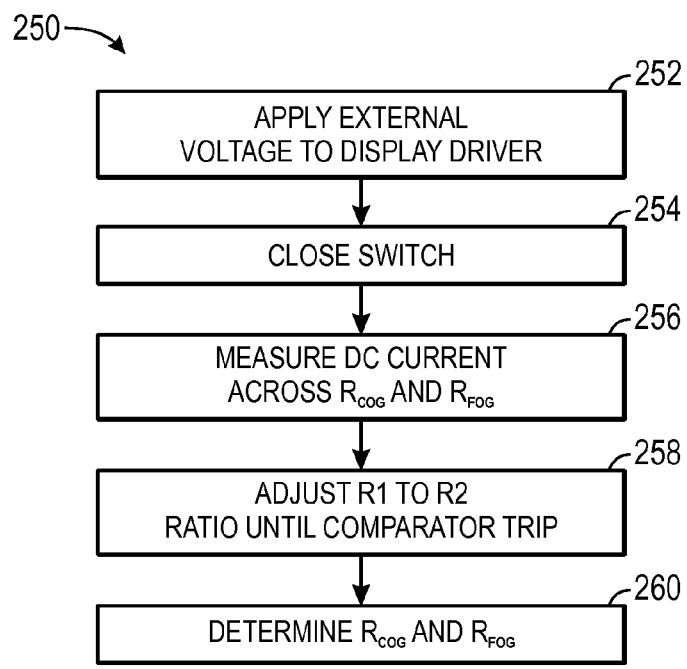
FIG. 16 is a flow chart that depicts a method for determining the COG resistance value and the FOG resistance value using the display driver IC of FIG. 14, in accordance with an embodiment.

Keeping the block diagram 240 of FIG. 15 in mind, FIG. 16 illustrates a method 250 for determining values of the COG resistance 76 and the FOG resistance 78 in the display 12 using the external voltage source 242 of FIG. 15. Referring now to FIG. 16, at block 252, the processor 18 may connect the external voltage source 242 to the supply rail 93 via test points in the FOG circuit 28.

At block 254, the processor 18 may close one of the switches 94 such that a DC current ($I_{EXT}$) conducts through the closed switch. At block 256, the processor 18 may measure the DC current ($I_{EXT}$) across the COG resistance 76 and the FOG resistance 78. The DC current may be measured using a current probe, source measurement units (SMU), or the like. The processor 18 may then, at block 258, adjust the variable resistor 101 such that the comparator 102 trips. By tripping the comparator 102, the processor 18 may determine the voltage $V_3$ at node 109 based on the known trip voltage ($V_{trip}$) and the resistance values of the resistor 99 and the variable resistor 101. Using the voltage $V_3$, the trip voltage ($V_{trip}$), and the value of the resistor 99, the processor 18 may determine the DC current value by applying Ohm's law. At block 260, the processor may determine the resistance value for the sum of $R_{COG}$ and $R_{FOG}$ based on the Equation 35 provided above. Like the methods described above, the processor 18 may periodically perform the method 250 to determine the values of the COG resistance 76 and the FOG resistance 78 over time as the display 12 ages, which may be useful in assessing the quality and durability of the display 12.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A display driver circuit comprising:
a capacitor configured to provide a plurality of voltages to a display via a supply rail, wherein the capacitor is coupled in series with a chip on glass (COG) circuit and a flex on glass (FOG) circuit of the display;
a plurality of resistors, wherein each of the plurality of resistors has substantially the same resistance value and wherein at least one of the plurality of resistors is associated with a matching error;
a plurality of switches configured to couple to the plurality of resistors, wherein each switch is configured to couple the capacitor to ground via a respective resistor of the plurality of resistors when closed, and wherein each resistor value of the plurality of resistors is associated with a different display manufacturer, one of which is the manufacturer of the display; and
an interface configured to communicate with a processor, wherein the interface is configured to measure a sum of a COG resistance value and a FOG resistance value by:
closing a first switch of the plurality of switches, thereby discharging the capacitor via a first resistor;
measuring a first amount of time between when the capacitor has a first voltage value and when the capacitor discharges to a second voltage value via the first resistor;
opening the first switch after the capacitor discharges to the second voltage value;
closing a second switch of the plurality of switches, thereby discharging the capacitor via a second resistor;
measuring a second amount of time that corresponds to an amount of time between when the capacitor has the first voltage value and when the capacitor discharges to the second voltage value via the second resistor;
simultaneously closing the first switch and the second switch;
measuring a third amount of time that corresponds to an amount of time between when the capacitor has the first voltage value and when the capacitor discharges to the second voltage value via the first resistor and the second resistor; and
determining the sum of the COG resistance value and the FOG resistance value based at least in part on the first amount of time, the second amount of time, the third amount of time, and the matching error.

2. The display driver circuit of claim 1, wherein the first voltage value corresponds to a voltage value configured to enable the display to receive one or more touch inputs.

3. The display driver circuit of claim 1, wherein the second voltage value corresponds to a voltage value configured to enable the display to display image data.

4. The display driver circuit of claim 1, comprising:
a comparator circuit configured to switch states when the capacitor reaches the second voltage value; and
a timer circuit configured to measure the first, second, and third amounts of time based at least in part on when the comparator circuit switches states and a clock input.

5. The display driver circuit of claim 4, wherein the timer circuit is coupled to the plurality of switches and is configured to open the first switch when the capacitor discharges to the second voltage value.

6. The display driver circuit of claim 1, wherein the interface is configured to measure the sum of the COG resistance value and the FOG resistance value periodically.

7. The display driver circuit of claim 6, wherein the interface is configured to:
store each sum of the COG resistance value and the FOG resistance value in a log; and
send the log to a server.

8. The display driver circuit of claim 1, wherein the interface is configured to determine the sum of the COG resistance value and the FOG resistance value based on:

$$t_1 = [R_{COG} + R_{FOG} + R] * C * \ln(V_0/V_1)$$

$$t_2 = [R_{COG} + R_{FOG} + R*(1+\epsilon)] * C * \ln(V_0/V_1)$$

$$T2 = [R_{COG} + R_{FOG} + 0.5*R*(1+\epsilon)/(1+\epsilon/2)] * C * \ln(V_0/V_1)]$$

wherein $R_{COG} + R_{FOG}$ corresponds to the sum of the COG resistance value and the FOG resistance value, R corresponds to a resistance value of the first resistor and the second resistor, $t_1$ corresponds to the first amount of time, $t_2$ corresponds to the second amount of time, T2 corresponds to the third amount of time, C corresponds to a capacitance value of the capacitor, $V_0$ corresponds to the first voltage value, $V_1$ corresponds to the second voltage value, and c corresponds to the matching error.

9. A system comprising:
a display configured to display image data and receive one or more touch inputs;
a capacitor configured to provide a plurality of voltages to the display via a supply rail, wherein the supply rail couples the capacitor in series with an internal resistance of the display;
a plurality of switches having a plurality of resistance values, wherein each resistance value is substantially similar, wherein at least one of the plurality of switches is associated with a matching error, wherein each resistance value of the plurality of resistance values is associated with a different display manufacturer, one of which is the manufacturer of the display, and wherein each switch is configured to couple the capacitor to ground when closed; and
a controller configured to measure an internal resistance value of the display by:
closing a first switch of the plurality of switches, thereby discharging the capacitor;
measuring a first amount of time between when the capacitor has a first voltage value and when the capacitor discharges to a second voltage value via the first switch;
opening the first switch after the capacitor discharges to the second voltage value;
closing a second switch of the plurality of switches;
measuring a second amount of time between when the capacitor has the first voltage value and when the capacitor discharges to a third voltage value via the second switch; and
opening the second switch after the capacitor discharges to the second voltage value;
simultaneously closing the first switch and the second switch;
measuring a third amount of time between when the capacitor has the first voltage value and when the capacitor discharges to the second voltage value via the first switch and the second switch; and
determining the internal resistance value based at least in part on the first amount of time, the second amount of time, the third amount of time, and the matching error.

10. The system of claim 9, comprising a comparator circuit coupled to the supply rail via a first resistor and to a voltage source via a second resistor, wherein the comparator circuit switches states when the capacitor discharges to the second voltage value.

11. The system of claim 9, wherein the controller is configured to acquire a plurality of measurements of the internal resistance a plurality of times.

12. The system of claim 11, wherein one or more changes in the plurality of measurements of the internal resistance corresponds to a decreased quality of the display.

13. The system of claim 9, wherein the controller is configured to measure the internal resistance value based on:

$$t_1 = [R_{COG} + R_{FOG} + R] * C * \ln(V_0/V_1)$$

$$t_2 = [R_{COG} + R_{FOG} + R*(1+\epsilon)] * C * \ln(V_0/V_1)$$

$$T2 = [R_{COG} + R_{FOG} + 0.5*R*(1+\epsilon)/(1+\epsilon/2)] * C * \ln(V_0/V_1)]$$

wherein $R_{COG} + R_{FOG}$ corresponds to the internal resistance value, R corresponds to a resistance value of the first switch and the second switch, $t_1$ corresponds to the first amount of time, $t_2$ corresponds to the second amount of time, T2 corresponds to the third amount of time, C corresponds to a capacitance value of the capacitor, $V_0$ corresponds to the first voltage value, $V_1$ corresponds to the second voltage value, and c corresponds to the matching error.

14. An electronic device comprising:
a display configured to display image data and receive one or more touch inputs;
a capacitor configured to provide a plurality of voltages to the display via a supply rail, wherein the supply rail couples the capacitor in series with chip on glass (COG) resistance and a flex on glass (FOG) resistance of the display;
a plurality of resistors, wherein each of the plurality of resistors has a different resistance value and wherein at least one of the plurality of resistors is associated with a matching error;
a plurality of switches configured to couple the plurality of resistors, wherein each switch is configured to couple the capacitor to ground via a respective resistor of the plurality of resistors when closed, and wherein each resistor value of the plurality of resistors is associated with a different display manufacturer, one of which is the manufacturer of the display;
a comparator circuit coupled to the capacitor via a first resistor and to a reference voltage source via a second resistor; and
a processor configured to measure a sum of a COG resistance value and a FOG resistance value of the display by:
closing a first switch of the plurality of switches, thereby discharging the capacitor via a first resistor;
measuring a first amount of time between when the comparator circuit changes states, wherein the comparator circuit changes states after the capacitor discharges from a first voltage value to a second voltage value;
opening the first switch after the capacitor discharges to the second voltage value;
closing a second switch of the plurality of switches, thereby discharging the capacitor via a second resistor;
measuring a second amount of time between when the comparator circuit changes states;
determining the sum of the COG resistance and the FOG resistance values based at least in part on the first amount of time, the second amount of time, and the matching error.

15. The electronic device of claim 14, wherein the processor is configured to determine the sum of the COG resistance and the FOG resistance values based on:

$$R_{COG}+R_{FOG}=-R+t_1/[C*\ln(V_0/V_1)]; \text{ and}$$

$$R_{COG}+R_{FOG}=-(X)*R*(1+\epsilon)+t_2/[C*\ln(V_0/V_1)]$$

wherein $R_{COG}+R_{FOG}$ corresponds to the sum of the COG resistance value and the FOG resistance value, R corresponds to a resistance value of the first resistor, X corresponds to a ratio of a resistance value of the second resistor to the resistance value of the first resistor, $t_1$ corresponds to the first amount of time, $t_2$ corresponds to the second amount of time, C corresponds to a capacitance value of the capacitor, $V_0$ corresponds to the first voltage value, V1 corresponds to the second voltage value, and c corresponds to the matching error.

16. The electronic device of claim 14, wherein the matching error is based at least in part on an arrangement of the first resistor with respect to the second resistor.

17. A liquid crystal display (LCD), comprising:
a display driver circuit configured to provide the LCD with a plurality of voltages via a supply rail, wherein the display driver circuit comprises:
a capacitor configured to provide a plurality of voltages to a display via a supply rail, wherein the capacitor is coupled in series with a chip on glass (COG) circuit and a flex on glass (FOG) circuit of the LCD;
a plurality of resistors, wherein each of the plurality of resistors has substantially the same resistance value and wherein at least one of the plurality of resistors is associated with a matching error;
a plurality of switches configured to couple to the plurality of resistors, wherein each switch is configured to couple the capacitor to ground via a respective resistor of the plurality of resistors when closed, and wherein each resistor value of the plurality of resistors is associated with a different display manufacturer, one of which is the manufacturer of the display; and
a processor configured to measure a sum of a COG resistance value and a FOG resistance value based at least in part on a first discharge waveform acquired after closing a first switch of the plurality of switches, a second discharge waveform acquired after closing a second switch of the plurality of switches, a third discharge waveform acquired after simultaneously closing the first switch and the second switch, and the matching error.

18. The LCD of claim 17, wherein the processor is configured acquire the first discharge waveform by:
closing a first switch of the plurality of switches, thereby discharging the capacitor via a first resistor;
measuring a first amount of time between when the capacitor has a first voltage value and when the capacitor discharges to a second voltage value via the first resistor; and
opening the first switch after the capacitor discharges to the second voltage value.

19. The LCD of claim 17, wherein the processor is configured acquire the second discharge waveform by:
closing a second switch of the plurality of switches, thereby discharging the capacitor via a second resistor;
measuring a second amount of time between when the capacitor has the first voltage value and when the capacitor discharges to the second voltage value via the second resistor; and
opening the second switch after the capacitor discharges to the second voltage value.

20. The LCD of claim 17, wherein the processor is configured acquire the third discharge waveform by:
simultaneously closing the first switch and the second switch, thereby discharging the capacitor via the first resistor and the second resistor;
measuring a third amount of time between when the capacitor has the first voltage value and when the capacitor discharges to the second voltage value via the first resistor and the second resistor; and
opening the first switch and the second switch after the capacitor discharges to the second voltage value.

* * * * *